Jan. 21, 1930.  L. HOLLAND-LETZ  1,744,393
TAKE-UP FOR MULTIPLE ANTIFRICTION BEARINGS
Filed Feb. 25, 1927  3 Sheets-Sheet 1
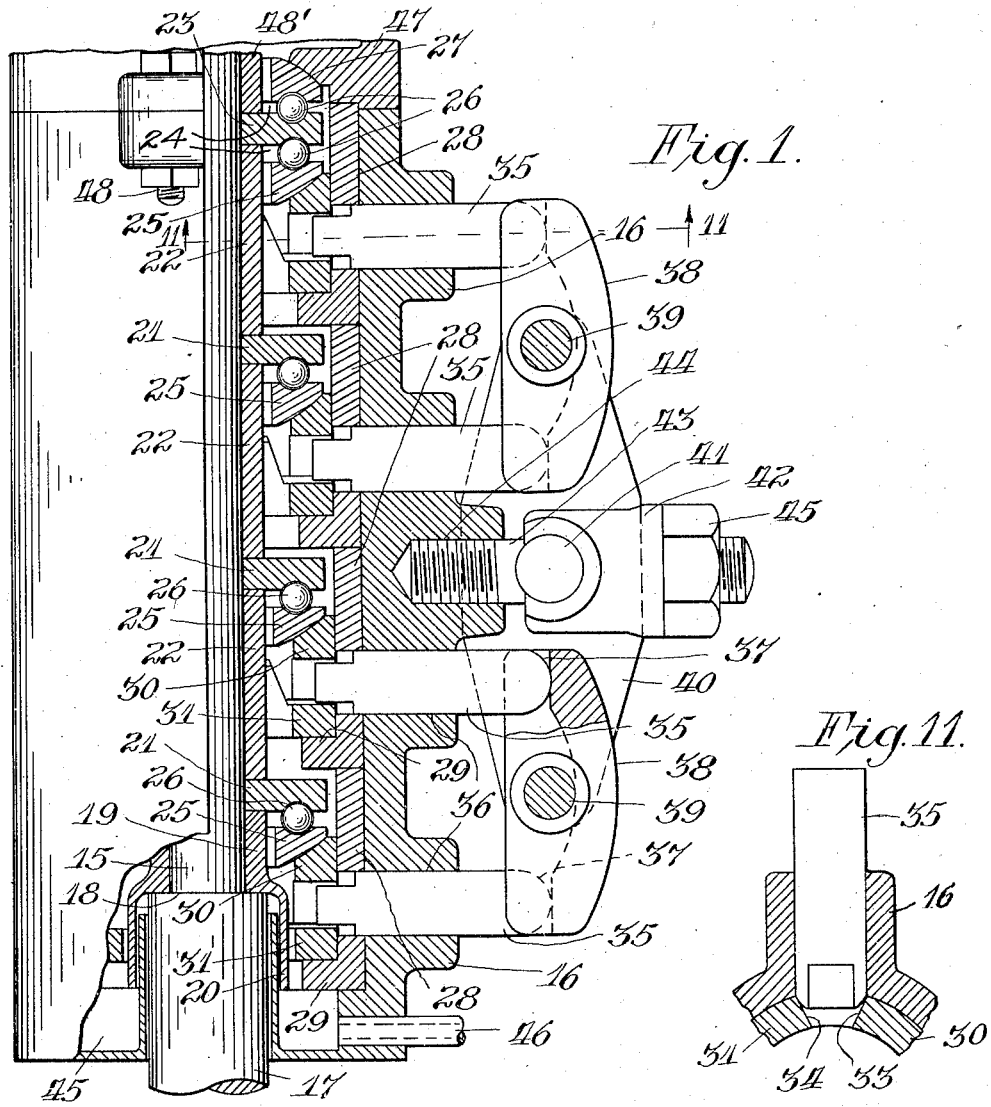
Inventor.
Ludwig Holland-Letz,
By John P. Smith
Atty.

Inventor:
Ludwig Holland-Letz,
By John P. Smith
Atty.

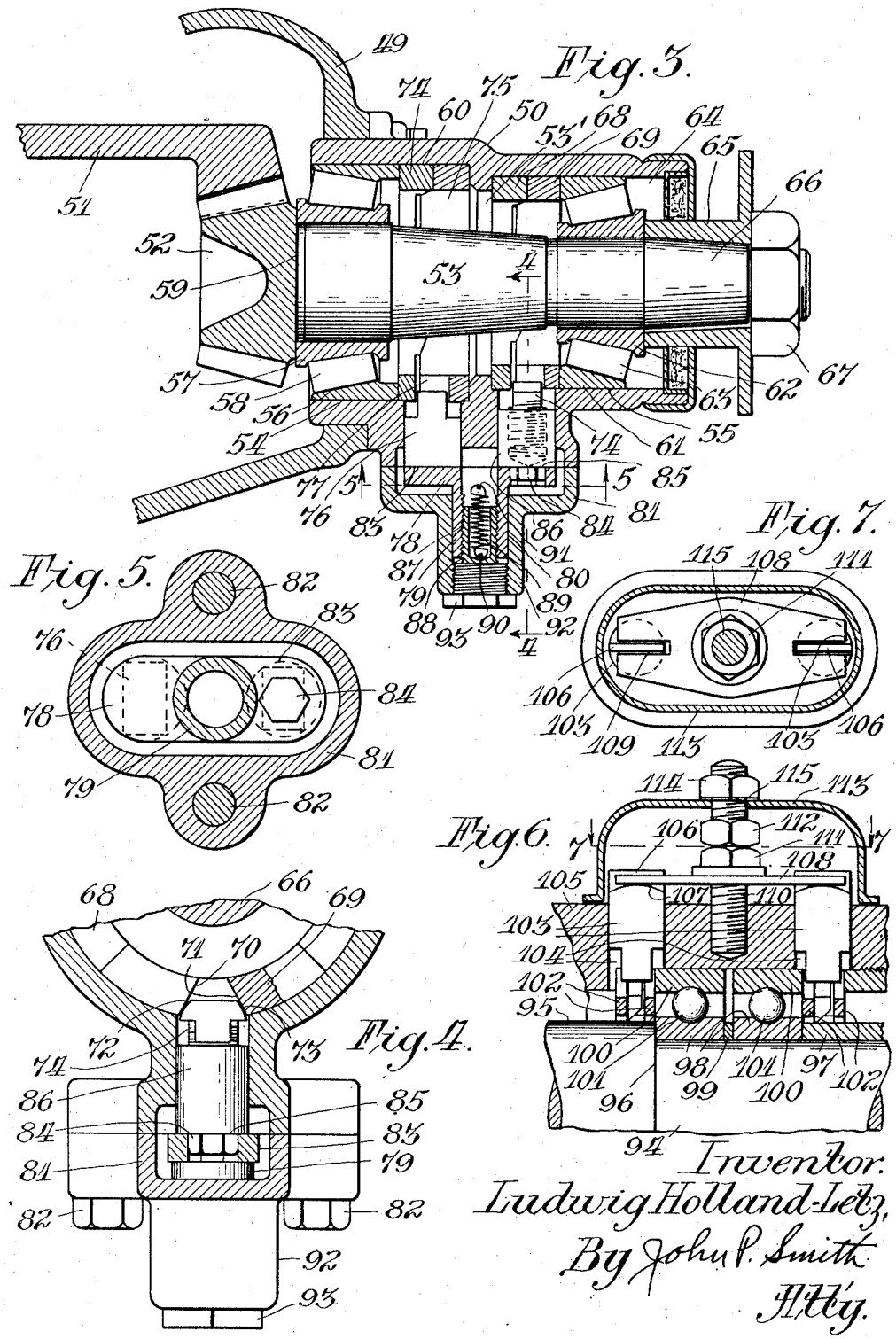

Patented Jan. 21, 1930

1,744,393

UNITED STATES PATENT OFFICE

LUDWIG HOLLAND-LETZ, OF CROWN POINT, INDIANA

TAKE-UP FOR MULTIPLE ANTIFRICTION BEARINGS

Application filed February 25, 1927. Serial No. 170,781.

This invention relates to a device for taking up the wear on the moving parts of a machine, such for instance as a lathe, shaper, milling machine, and the like, but is more particularly adapted for use for anti-friction bearings in which revolving shafts carrying excessive thrust or combined radial and thrust loads, such for instance as centrifugal pumps for deep wells and the like.

The present invention is also particularly adapted for use of anti-friction thrust bearings of the multiple type in which a differential distribution of the end thrust pressure is required to be distributed to the different bearings of the shaft.

One of the objects of the present invention is to provide a novel and improved form of a multiple thrust bearing construction in which the thrust pressure is equally or unequally distributed to the various thrust bearings in accordance with the requirements to which the invention is applied.

A still further object of the invention is to provide a novel and improved construction of a multiple thrust bearing in which the end thrust is equally distributed through the means of an equalizing mechanism which unequally distributes the pressure in such a manner that the greater pressure on one thrust bearing is passed to the other bearing by reason of their co-operative relation with respect to each other. This construction permits both the thrust bearings to carry equal thrust bearing loads.

A still further object of the invention is to provide a multiple thrust bearing take-up for anti-friction bearings in which the end thrust is equally taken up in both directions of the operation of the shaft in such a manner that the possibility of longitudinal movement of the shaft is entirely eliminated and at the same time the end thrust wear occurring in the opposed thrust bearings is simultaneously and equally taken up.

A still further object of the invention is to provide an improved form of multiple opposed thrust bearings in which the take-up is yieldingly supported and operated in a manner to force the thrust bearing members toward each other for maintaining the shaft in its initial longitudinal alignment with respect to the bearing.

These and other objects are accomplished by providing a construction and an arrangement of the various parts in the manner hereinafter described and particularly pointed out in the appended claims.

The present invention is an improvement on the various forms of application for the construction disclosed in my co-pending application, Serial No. 144,292, filed October 26, 1926.

Referring to the drawings:

Figure 1 is a side elevational view of a portion of a rotary shaft for a well pump with portions thereof shown in cross-section and embodying my improved form of multiple thrust bearing;

Figure 3 is a partial cross-sectional view of a rear axle construction of a pinion shaft showing another form of my improved equalizing multiple bearing take-up device;

Figure 4 is an enlarged cross-sectional view taken on the lines 4—4 of Figure 3;

Figure 5 is an enlarged cross-sectional view taken on the lines 5—5 of Figure 3;

Figure 6 is a fragmentary view partly in cross-section of another form of end thrust bearing for a high speed spindle in which my improved equalizing device is embodied for eliminating longitudinal movement of the spindle;

Figure 7 is a cross-sectional view taken on the lines 7—7 in Figure 6;

Figure 10 is a perspective view of the construction of a pair of camming washers which co-operate with the movable member for effecting an adjustment of the braces on the anti-friction bearing; and Figure 11 is a cross-sectional view taken on the lines 11—11 of Figure 1.

Figure 8:
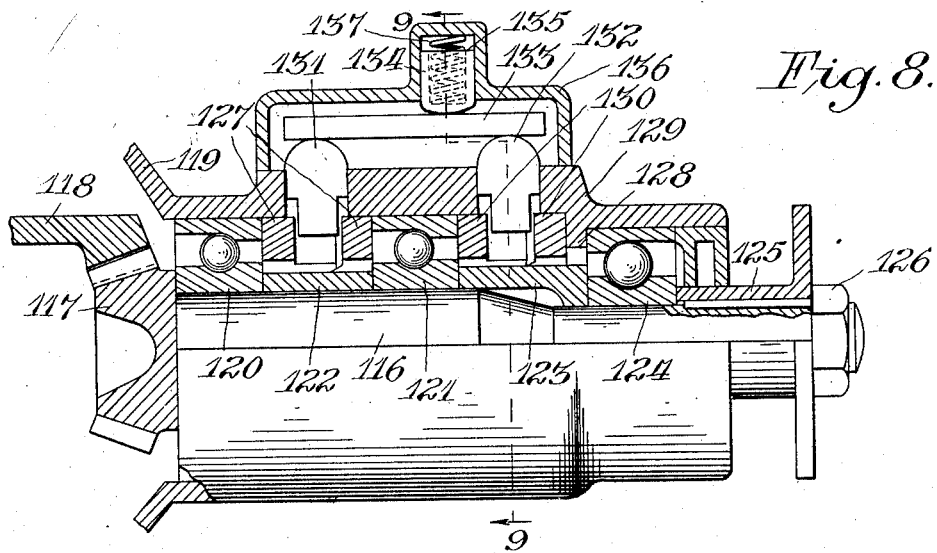
Figure 8 is a fragmentary top plan view of another form of my improved multiple equalizing take-up construction embodied in the rear axle construction of a vehicle.
Figure 2:
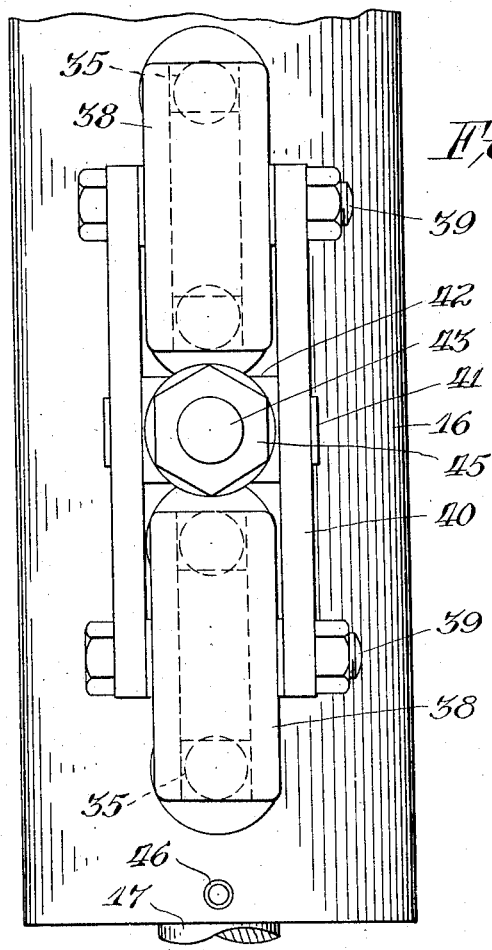
Figure 2 is a side elevational view of the device shown in Figure 1.
Figure 9:
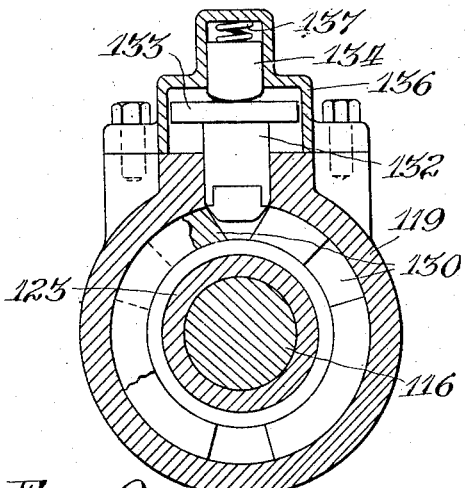
Figure 9 is a cross-sectional view taken on the lines 9—9 in Figure 8.

Heretofore considerable difficulty has been experienced in successfully maintaining uniform thrusts on all thrust bearings on shafts in which excessive weight or loads are carried, particularly where a great number of bearings are employed, such for instance as shafts for deep well pumps or shafts having relatively long vertical lengths in which power may be transmitted on various floors in a building. Heretofore some attempts have been made to provide a plurality of end thrust bearings so that individual bearings would bear the proportional amount of the load, but these attempts have not proven to be entirely practicable.

It is therefore the principal object of the present invention to provide a construction which will adjust multiple thrust bearings in such a manner that the load will be equally and evenly distributed to all the bearings so that the greatest efficiency in operation, as well as the number of replacements, will be reduced to a minimum.

Referring specifically to the drawings, I have shown for the purpose of illustration a vertically mounted shaft 15 supported in a frame structure 16. The lower end of the shaft is provided with an enlarged portion 17 forming a shoulder 18 therein. Mounted on the shaft 15 and abutting the shoulder 18 is a spacer sleeve 19 which has a downwardly extending enlarged tubular flange 20. Mounted on the upper end of the spacer sleeve 19 is a laterally extending bearing race in the form of an enlarged washer 21. At regular intervals any number of these washers or races 21 may be spaced by suitable sleeves 22 which surround and engage the shaft 15. It will of course be understood that any number of these bearings may be placed at regular intervals along the shaft in accordance with the requirement or load under which the shaft is placed. The upper or last bearing is provided with a special form of race or washer 23 which is provided on its opposite sides with raceways 24. Cooperating with the races 21 and 23 are a plurality of co-operating races 25. Positioned between the races 21 and 25 are the usual bearing balls 26. The upper end or last bearing is provided with an opposing race 27. Embracing the shaft and bearing races 21 and 25 are cylindrical shells 28. Each of the cylindrical shells 28 is provided on its lower end with inwardly extending annular flanges 29. Mounted between each of the annular flanges 29 of each of the cylindrical shells 28 are pairs of expanding or camming rings 30 and 31, respectively. These expanding or camming washers 30 and 31 are provided with laterally extending camming projections 32 which co-operate with each other for moving the rings laterally longitudinally with respect to each other in the manner clearly described and claimed in my above referred to application. The camming projections 32 of each of the camming rings 30 and 31 are provided with inwardly converging surfaces 33 and 34 so as to form a substantially V-shaped pocket for the reception of reciprocating wedge members 35. The reciprocating wedge members 35 are cylindrical in form and are reciprocally mounted in spaced bores 36 formed in the frame member 16. The wedge members 35 have their outer ends preferably rounded as shown at 37 and are adapted to be engaged by an equalizing or pressure distributing member 38. The equalizing or pressure distributing member 38 is pivoted on a transverse bolt 39 which in turn is mounted in oppositely disposed rocker members 40. The rocker members 40 are pivotally mounted on the laterally projecting studs 41 secured to the sleeve 42. The sleeve 42 is adjustably and slidably mounted on a stud 43 which in turn is secured to the frame 16 in a threaded bore 44.

The lower end of the frame 16 is provided with an oil well 45 to which is connected a tube 46 for the return of the oil to the upper end of the shaft by a circulator.

The outer end of the stud 44 is provided with an adjusting nut 45′.

The race 27 is held in position in a cap 47 which in turn is secured to the frame 16 by suitable bolts 48.

The entire load of the shaft 15 is sustained by a collar 48′, only a part of which is shown.

From the above description it will be seen that as wear ensues on the races 21 and 25 the adjusting nut 45 may be turned in a direction to move the rocker members 40 inwardly with respect to the center of the shaft, which in turn carry the equalizing members 38 inwardly, thereby forcing the wedge members in the same direction and by reason of the inner curved surfaces of the wedge members 35 engaging the converging surfaces 33 and 34 of the camming washers 30 and 31 respectively, the washers will be revolved in opposite directions with respect to each other, thereby forcing each race 25 against its co-operating balls 26 and thereby take up the wear in a direction to force the shaft upward against its opposing bearing or race 27. This construction, it will be noted, is such that the equalizing arms 38 and rocking members 40 equally adjust the wedge members so that the wear or pressure is equally and evenly distributed throughout the entire assembly.

In the modified form shown in Figure 3, I have illustrated the rear axle construction of a vehicle which comprises the usual differential housing 49 and pinion shaft sleeve 50. Mounted within the differential housing and pinion shaft 50 are the usual gear 51, pinion 52, and pinion shaft 53. Formed intermediate the ends of the pinion sleeve 50 is an inwardly extending annular flange 53′. Mounted in the opposite ends of the pinion sleeve 50 are two opposed anti-friction bearings generally referred to by the reference characters 54 and 55, respectively. The anti-friction bearing 50 consists of an outer bearing race 56, inner bearing race 57, and anti-friction rollers 58 mounted therebetween. The inner bearing race 57 is secured to the pinion shaft and is in thrust engagement with the pinion as shown at 59. The outer bearing race 56 is mounted in sliding engagement with the inner cylindrical bore 60 of the pinion sleeve 50. The other anti-friction bearing member 55 comprises the outer bearing race 61, inner bearing race 62, and roller bearing 63. The outer bearing race 61 is in sliding engagement in the reduced bore 64 of the pinion sleeve 50. The inner bearing race 62 is secured to the pinion shaft 53 in thrust engagement with the propeller shaft flanged member 65, which in turn is mounted on the tapered portion 66 of the pinion shaft and secured thereon by a nut 67. Mounted between the annular flange 53′ of the pinion sleeve 50 and the outer race 61 of the anti-friction bearing 55 are two expanding or camming washers 68 and 69. These camming washers are of the construction described and illustrated in Figure 10 of the drawings and specifically described and claimed in my co-pending application above referred to. The camming washers 68 and 69 are provided with laterally projecting co-acting cam projections which permit them to move outwardly with respect to each other in the manner illustrated in Figure 10 of the drawings and are provided with inwardly converging surfaces 70 and 71 which are adapted to be engaged by the curved surfaces 72 and 73 respectively of the wedge member 74 (see Figure 4). In the same manner, the outer race 56 of the anti-friction bearing 54 is longitudinally adjusted within the bore 60 of the pinion sleeve by two similar camming washers 74 and 75. These camming washers are similarly provided with co-acting camming projections which adjust them longitudinally or cause them to expand and are actuated by a wedge member 76 which engages the bevel or converging surface 77 of the washers 74 and 75.

One of the essential features of my invention as disclosed in the modified form shown in Figure 3 comprises the provision of a take-up which may be manually or automatically operated and in which two opposed anti-friction bearings are simultaneously actuated for taking up the end thrust wear in both directions and at the same time are so controlled by my improved device as to eliminate any possibility of longitudinal movement of the pinion shaft from its initially set position so that the pinion will always maintain its co-operative relation with the gear of the differential mechanism.

Another essential feature of the modification shown in this figure is the provision of an adjusting mechanism in connection with the wedge member whereby in the original installation of my improved device the adjusting camming washers may be moved by adjusting the extension of the wedge member so that the outer ends of the wedge members are in substantial alignment at the time that the opposed anti-friction bearings are in their operative relation and the pinion of the pinion shaft in its operative relation with respect to the gear.

This mechanism comprises a reciprocally actuated T-shaped pressure distributing member 78 with its lower end cylindrical in form as shown at 79, the cylindrical portion thereof reciprocally mounted in the bore 80 formed in a removable cap 81. The cap 81 is secured to the pinion sleeve 50 by means of bolts 82. One of the arms of the T-shaped member is adapted to engage the wedge member 76 as shown at 83. The other arm of the T-shaped member 78 is provided with a polylateral aperture 84 which is adapted to engage a similarly configurated projection 85 formed on the lower end of the wedge member extensions 86 which in the present instance is in the form of a threaded sleeve which receives in threaded engagement the threaded portion of the wedge member 74. The cylindrical portion 79 of the T-shaped member 78 is provided with a threaded bore 87 which received in threaded engagement therewith a spring adjusting member 88. Mounted in the spring adjusting member 88 is a torsional spring 89 which has one end thereof secured by means of a pin 90 to the spring adjusting member 88, and the other end thereof secured to the T-shaped member by a second pin 91. Mounted in the barrel portion 92 of the cap 81 is a threaded plug 93 which has threads of a lesser pitch than the pitch of the threads of the spring adjusting member 88.

From the above description it will be seen that when the spring 89 is placed under torsional tension as disclosed in my co-pending application, Serial No. 144,292, filed October 26, 1926, the T-shaped member will be actuated inwardly toward the pinion shaft, thereby forcing the wedge members 76 inwardly and actuating the camming washers in the manner above described for taking up the wear on the opposed anti-friction bearings and at the same time maintaining the shaft in its longitudinal alignment which in turn maintains the gear in pinion and proper meshing relation.

In the original design where two bearings oppose one another the design should be so constructed that the wear on each of the bearings will be equally divided in which my improved type of take-up as shown in Figure 3 will maintain this same relation at all times. The same is true of the form shown in Figure 6 hereafter described.

In the modified form shown in Figure 6, I have illustrated an application of my improved multiple bearing take-up device which is of a yielding construction for maintaining a spindle or shaft in a relatively fixed longitudinal position with respect to its bearings. This structure comprises a shaft 94 which is provided with a large portion 95 forming a shoulder 96 therebetween. Clamped between the shoulder 96 and the sleeve 97 are two ball bearing races 98 which are held in spaced relation by a spacer ring 99. Cooperating with each of the inner ball bearing races 98 are two outer anti-friction races 100. Positioned between each of the races 98 and 100 are the usual anti-friction bearing balls 101. The anti-friction bearing races 100 have positioned on the opposite sides thereof, the expanding camming washers 102 which are similarly constructed in configuration and shape as the camming washers shown in Figure 10, except that the ones shown in this figure are somewhat thinner in their width, but are constructed so as to be actuated in the same identical manner. These camming washers 102 are actuated by reciprocating wedge members 103 which are mounted in apertures 104 formed in the frame 105 of the shaft. The wedge members 103 are provided with upwardly extending flanges or tongues 106 formed by having the opposite sides of the wedge members cut on the arcs of circles as shown at 107. The tongues 106 of each of the reciprocating wedge members 103 are adapted to receive in loose engagement therewith a resilient pressure distributing member 108 which is provided with bifurcated portions as shown at 109 for engaging the respective tongues 106 of the wedge members 103. The pressure distributing member is supported in position on the frame by a threaded stud 110 and is adjusted to various positions on the stud by a nut 111. The nut 111 is locked in various positions of adjustment by a lock nut 112. In order to protect my improved multiple take-up device I have provided a cup-shaped covering in the form of a sheet metal cap 113 which is secured in position to completely encase the operating parts thereof by the nut 114 and lock washer 115.

From the construction above described it will readily be seen that by providing a pressure distributing member of spring material both wedge members may be simultaneously held under resilient equal pressure, thereby providing an automatic take-up for taking up the wear on the bearings simultaneously. It will also be noted that by reason of the flat construction of the nut which engages the spring it maintains the shaft in a longitudinally fixed position with respect to the bearing.

In the modified form shown in Figure 8, I have shown a novel form of multiple anti-friction bearing take-up used in connection with the pinion shaft of the rear axle construction of a motor vehicle. In this construction two anti-friction end thrust bearings are mounted in co-operative relation for sustaining the radial load and end thrust load in one direction of the shaft. In this construction the equalizing means is so constructed that the unequal pressure exerted on the wedge members causes the pressure exerted to one of the anti-friction bearings to pass to the other anti-friction bearings so that each of these bearings sustains an equal load.

This construction comprises a pinion shaft 116 which in turn is provided with a pinion 117 and gear 118 mounted in the differential housing 119. The pinion shaft 116 is provided with two spaced apart anti-friction bearing members generally referred to by the reference characters 120 and 121. Both the anti-friction bearing members 120 and 121 are adapted to sustain both the radial load and the outward thrust of the pinion 117. The inner races of each of the anti-friction bearings 120 are held in spaced relation by a spacer sleeve 122. The inner races of the anti-friction bearings 120 and 121 are secured to the shaft by a second spacer sleeve 123 which in turn holds in spaced relation an outer anti-friction bearing generally referred to by the reference character 124. All of these parts are secured to the shaft by a propeller shaft flanged member 125 which in turn is secured thereon by a nut 126. The outer bearing races of each of the anti-friction bearings 121 are held in co-operative relation by a pair of expanding camming washers 127. Mounted between the outer bearing race of the anti-friction bearing 121 and an annular flange 128 formed in the pinion sleeve 129 is a second pair of expanding or camming washers 130. Both of these pairs of camming washers are actuated to expand for taking up the wear in the manner above described by two reciprocating members or wedges 131 and 132. The upper portion of the wedge members 132 are rounded in one direction as clearly shown in Figure 8 and support on the top thereof an equalizer plate 133. The equalizer plate 133 is adapted to be spring pressed in a direction toward the pinion shaft 116 by a spring pressed member in the form of a thimble 134 which is mounted in a cylindrical socket 135 formed in the cap or cover 136. The reciprocating member 134 is provided with a socket and is normally pressed outwardly with respect to the socket 135 by a spring 137. The reciprocating member 134 is positioned nearer to the reciprocating wedge member 132 for the purpose of exerting a greater pressure on the wedge member 130

132 and thereby exerting a greater pressure on the outer race of the anti-friction bearing member 121. In so doing the pressure exerted on the expanding washer 127 contacts with the outer race of the anti-friction bearing 121 so that the resulting pressure exerted on both the anti-friction bearings 120 and 121 is equalized.

From the above description it will be seen that any number of thrust bearings may be similarly connected up with equalizing or pressure distributing members so that the pressure of the equalizer or pressure distributor may be proportioned in a similar manner to distribute the pressure on each of the bearings according to the particular requirements, or as desired.

From the above description it will be seen that I have provided a novel and improved construction of a device for taking up the wear on multiple antifriction thrust or combined thrust bearings and in which by reason of the form of equalizing mechanism the load is equally distributed over the multiple bearings in such a manner that each and every bearing sustains its proportionate part of the load and wear. It will also be noted that by my improved construction the equalizing means may be additionally employed for actuating the bearings for maintaining the shaft from longitudinal movement or if it is found necessary it may be employed for shifting the shaft longitudinally in accordance with the special requirements and adaptations to which my device is employed.

While in the above specification I have described a few modifications and adaptations in which my invention may be employed, it will of course be understood that the same is capable of additional modifications and such modifications may be made without departing from the spirit and scope of the invention as expressed in the following claims.

What I claim as my invention and desire to secure by Letters Patent is:

1. A device for taking up the wear on a multiple bearing for a shaft comprising a plurality of expanding members, a plurality of movable members engageable with said expanding members, an equalizing member engaging said movable members, and means engaging said equalizing member for exerting pressure on said movable members.

2. A device for taking up the wear on a multiple bearing for a shaft comprising a plurality of expanding members, a plurality of reciprocable members engageable with said expanding members, means for engaging said reciprocable members, and means for engaging said first-named means for exerting pressure on said reciprocable members.

3. A device for taking up the wear on a multiple bearing for a shaft comprising a plurality of expanding members, a plurality of movable members engageable with said expanding members, means for engaging said movable members, and means engaging said first-named means for exerting pressure on said movable members.

4. A device for taking up the wear on a multiple bearing for a shaft comprising a plurality of expanding members, a plurality of reciprocable members engageable with said expanding members, a pivotally mounted equalizing member engaging said reciprocable members, and means for adjusting the pivot of said equalizing member for exerting pressure on said reciprocable members.

5. A device for taking up the wear on a multiple bearing for a shaft comprising a plurality of expanding members, a plurality of movable members engageable with said expanding members, an equalizing member engaging said movable members, and adjustable means engaging said equalizing member for holding said movable members in predetermined positions of adjustment.

6. A device for taking up the wear on a multiple bearing for a shaft comprising a plurality of radially movable members, means actuated by said movable members for taking up the wear on said bearings, and equalizing means engageable with said movable members for exerting pressure on said movable members.

7. A device for taking up the wear on a multiple bearing for a shaft comprising a plurality of expanding members, a plurality of movable members engageable with said expanding members, equalizing means engageable with said movable members, and a rocker arm operatively connected with said equalizing means for exerting pressure on said movable members and thereby actuating said expanding members 8. A device for taking up the wear on a multiple bearing for a shaft comprising a plurality of expanding members, a plurality of movable members engageable with said expanding members, a plurality of equalizing members engageable with certain of said movable members, and a rocker arm pivotally connected with said equalizing members for exerting pressure on said movable members.

9. A device for taking up the wear on a multiple bearing for a shaft, comprising a frame in which said shaft is mounted, a plurality of anti-friction bearings mounted between said shaft and said frame, a plurality of races for said anti-friction bearings, certain of said races being movable with respect to said frame, and means for simultaneously adjusting certain of said races comprising a plurality of movable members and an equalizing member pivoted to said frame and engaging said movable members for exerting pressure on said movable members.

10. A device for taking up the wear on a multiple bearing for a shaft, comprising frame in which said shaft is mounted, a plurality of anti-friction bearings mounted between said shaft and said frame, a plurality of races for said anti-friction bearings, certain of said races being movable with respect to said frame, and means for simultaneously adjusting said movable races including a plurality of movable members, equalizing members engaging said movable members, and a rocker member engaging said equalizing members for exerting pressure on said movable members.

11. A device for taking up the wear on a multiple bearing for a shaft comprising a frame in which said shaft is mounted, a plurality of anti-friction bearings mounted between said shaft and said frame, a plurality of races for said anti-friction bearings, certain of said races being movable with respect to said frame, means for simultaneously adjusting said movable races including a plurality of movable members, equalizing members engaging said movable members, and a rocker member engaging said equalizing members for exerting pressure on said movable members, and a rocker member engaging said equalizing members for exerting pressure on said movable members, and an adjustable means connecting said frame with said rocker member for varying the pressure on said movable members.

12. A device for taking up the wear on multiple bearings for a shaft comprising a plurality of radially movable members and means engaging said movable members for automatically actuating said movable members for exerting pressure on said movable members.

13. A device for taking up the wear on a multiple anti-friction bearing comprising a plurality of movable members, a plurality of pairs of oppositely rotatable camming rings actuated by said movable members for moving certain of the races longitudinally with respect to each other, and means engaging said movable members for exerting equal pressure on said movable members whereby the pressure is equally borne by all of said anti-friction bearings.

14. A device for taking up the wear on multiple anti-friction bearing for a shaft comprising a frame in which said shaft is mounted, a plurality of anti-friction bearings mounted in said frame for supporting said shaft including a plurality of races and anti-friction bearing members, a plurality of expanding camming rings mounted in said frame and engageable with certain of said anti-friction races, a plurality of movable members mounted in said frame and engageable with said expanding rings and pressure distributing member mounted on said frame and operatively related to said movable members for distributing the pressure on said anti-friction bearings.

15. A device for taking up the wear on a multiple bearing for a shaft comprising a plurality of expanding members, a plurality of movable members engageable with said expanding members for actuating said members to expand, a pressure distributing member operatively related to said movable members and means for adjusting said distributing member.

16. A device for taking up the wear on a multiple bearing for a shaft comprising a frame in which said shaft is mounted, a plurality of spaced apart anti-friction bearings mounted between said shaft and frame, a plurality of rotatable camming rings positioned between said anti-friction bearings and frame, means mounted in said frame for actuating said camming rings and means mounted on said frame engageable with said first named means for distributing the pressure between said anti-friction bearings.

17. A device for taking up the wear on a multiple bearing for a shaft comprising a frame in which said shaft is mounted, a plurality of anti-friction bearings mounted between said shaft and frame including a plurality of races and anti-friction bearing members, a plurality of rotatable camming rings mounted between certain of said races and said frame, a plurality of reciprocable wedge members mounted in said frame and for rotating said caming rings in opposite direction with respect to each other and means mounted on said frame and engageable with said wedge members for distributing the pressure between said anti-friction bearings.

18. A device for taking up the wear on multiple bearing for a shaft comprising a plurality of radially reciprocable members, a plurality of oppositely rotatable members mounted concentrically with respect to said shaft and adapted to be engaged by said reciprocable members and means engageable with said reciprocable members for automatically actuating said members for distributing the pressure on said reciprocable members.

19. A device for taking up the wear on a multiple anti-friction bearing for a shaft comprising a frame in which said shaft is mounted, a plurality of anti-friction bearings mounted in said frame for supporting said shaft including a plurality of races and anti-friction bearing members, a plurality of oppositely rotatable camming rings mounted in said frame and engageable with certain of said anti-friction races, a plurality of reciprocable and radially movable members mounted in said frame and engageable with said camming rings and a pressure distributing member mounted on said frame and operatively related to said reciprocable members for distributing the pressure on said antifriction bearings.

In testimony whereof I have signed my name to this specification on this 21st day of February, A. D. 1927.

LUDWIG HOLLAND-LETZ.